United States Patent
Aker

[11] Patent Number: 5,356,095
[45] Date of Patent: Oct. 18, 1994

[54] ATTENUATING LINGED DEPLOYMENT APPARATUS

[75] Inventor: Gary I. Aker, Silver Spring, Md.

[73] Assignee: Fairchild Space and Defense Corporation, Germantown, Md.

[21] Appl. No.: 924,489

[22] Filed: Aug. 4, 1992

[51] Int. Cl.$^5$ ............................................. B64G 1/44
[52] U.S. Cl. ................................ 244/173; 16/284
[58] Field of Search ............... 244/173; 16/284, 35 D

[56] References Cited

U.S. PATENT DOCUMENTS

| | | | |
|---|---|---|---|
| 1,386,621 | 8/1921 | Hughes | 16/284 |
| 2,693,003 | 11/1954 | Fuente | 16/35 D |
| 3,587,999 | 6/1971 | Miniovitch et al. | 244/173 |
| 4,290,168 | 9/1981 | Binge | 244/173 X |
| 4,747,566 | 5/1988 | Kiendl | 244/173 |
| 4,880,188 | 11/1989 | Roth et al. | 244/173 |

FOREIGN PATENT DOCUMENTS

| | | | |
|---|---|---|---|
| 0455638 | 4/1949 | Canada | 16/284 |
| 0234898 | 9/1990 | Japan | 244/173 |

*Primary Examiner*—Karin L. Tyson
*Assistant Examiner*—Christopher F. Ellis
*Attorney, Agent, or Firm*—Michael W. York

[57] ABSTRACT

Deployment apparatus for use in deploying an articulating structure. The deployment apparatus includes two pivotally connected hinge members and a spring that biases the hinge members in their open or deployed positions. An attenuator is also connected to one of the hinge members that prevents oscillatory movement between the hinge members as they are assuming their deployed positions and a cam member and a lobe on one of the hinge members lock the hinge members in position together as the hinge members are being extended to their deployed positions. The attenuator is adjustable and can be used to precisely fix the position of the deployed hinge members. The deployment apparatus is particularly suited for a wide variety of spacecraft applications where it can be used to extend spacecraft structures such as solar panels.

14 Claims, 3 Drawing Sheets

ATTENUATING LINGED DEPLOYMENT APPARATUS

BACKGROUND OF THE INVENTION

Deployment apparatus that permit structures to be deployed from one configuration to another have numerous uses. They can be used to permit a wide variety of panel or boom type structures to be deployed or extended into an in use configuration. Typically, most deployment apparatus have several problems. The inertia effect and the sudden deceleration forces of a member such as a panel or the like can result in the deployment elements overloading and overshooting the desired end position which can also result in the structure that is being deployed oscillating back and forth near its desired end position.

Such oscillations and the sudden changes in inertia at the deployed position are generally undesirable with any type of deployment apparatus. However, if the structure that is to be deployed is to be used in space, then such oscillations and the sudden change in inertia are even more objectionable and in many cases cannot be tolerated. Such oscillations and bouncing can result in damage to the space structure that is being deployed or prevent it from being properly positioned so that it can not accomplish its desired mission. This can result in the complete failure of a satellite system.

Consequently, a definite need exists for a deployment apparatus that prevents oscillations upon deployment and any damage of the structure due to deceleration forces at the end of deployment. For space applications, it is also essential in many applications that the deployed structure be positioned accurately in a given predetermined fixed position so that the equipment or apparatus attached to the deployed structure such as solar cells and the like function as intended with a high degree of efficiency.

The deployment apparatus of this invention overcomes these problems associated with previous typical deployment mechanisms and meets the rigid requirements for even the most demanding space applications. With the deployment apparatus invention any oscillation is effectively dampened and it is not possible for the deploying structure to move backward or to bounce once the deployment process has begun. Moreover, the deployed structure is located in a predetermined fixed position with a high degree of precision. In addition with the deployment apparatus invention it is possible to adjust the final fixed deployed position and control the deceleration forces near the end position. As a consequence, it is possible to make final adjustments to the deployment apparatus after it has been assembled to the associated structure. The deployment apparatus is particularly useful in connection with space craft panel structure such as solar panels, antenna and the like.

BRIEF DESCRIPTION OF THE INVENTION

This invention relates to deployment apparatus and more particularly to deployment apparatus that incorporates a shock absorber to reduce or prevent oscillations.

It is accordingly an object of the invention to provide deployment apparatus that effectively uses shock attenuation and prevents oscillations as the deployment apparatus comes to rest at the end of deployment.

It is also an object of the invention to provide deployment apparatus that is prevented from moving back into its undeployed position after the deployment apparatus has reached a certain deployed position.

It is an additional object of the invention to provide deployment apparatus that prevents damage to attached structures due to oscillations and shock.

It is an object of the invention to provide deployment apparatus that prevents damage due to inertial effects as the deployment apparatus reaches its deployed end position.

It is an object of the invention to provide deployment apparatus that is effectively positively locked in its open or deployed position.

It is an object of the invention to provide deployment apparatus that is positively locked up prior to onset of shock attenuation.

It is an object of the invention to provide deployment apparatus that requires very little energy and yet overcomes adverse inertial effects.

It is an object of the invention to provide deployment apparatus that does not require any fluid or eddy current dampening device or systems.

It is an object of the invention to provide deployment apparatus that is totally mechanical in its operation.

It is also an object of the invention to provide a deployment mechanism that is reusable.

It is also an object of the invention to provide deployment apparatus that uses a reusable non-destructible attenuation module or capsule.

It is an object of the invention to provide deployment apparatus that is usable with a wide variety of deployable structures.

It is an object of the invention to provide deployment apparatus that is suited for use with a wide variety of articulating structures.

It is an object of the invention to provide deployment apparatus that is particularly useful for satellite or other space structures.

It is an object of the invention to provide deployment apparatus that is particularly useful for a wide range of satellites.

It is an object of the invention to provide deployment apparatus that is particularly useful for small satellites.

It is an object of the invention to provide deployment apparatus that permits adjustment of the deployment forces, onset positions for start of attenuation predetermined end of deployment position and adjustment of the attenuation force and stroke.

It is an object of the invention to provide deployment apparatus that is particularly suited for use with satellites that have multiple solar array panels.

It is also an object of the invention to provide deployment apparatus that is easy to manufacture.

It is also an object of the invention to provide deployment apparatus that has interchangeable parts.

It is also an object of the invention to provide deployment apparatus that is comparatively inexpensive to manufacture.

It is also an object of the invention to provide deployment apparatus that is very reliable.

These and other objects will be apparent from the following description of the deployment apparatus invention that includes a first hinge member, a second hinge member, means for pivotally connecting the first hinge member to the second hinge member, means for biasing the hinge members in their deployed position and means for preventing oscillations or back lash of one of the hinge members with respect to the other hinge member. The deployment apparatus also includes means for locking one of the hinge members with respect to the other hinge member comprising a projecting lobe on one of the hinge members and a cam located in position to engage the projecting lobe. The cam also has a projecting positioning member or portion that moves the cam into the proper camming position when the hinge member with the projecting lobe moves into its deployed or extended position. Adjusting means for accurately adjusting the final deployed for extended position of one of the hinge members are also provided and comprises a portion of the means for shock attenuation of one of the hinge members with respect to the other hinge member.

BRIEF DESCRIPTION OF THE DRAWINGS

The invention will be hereafter more completely described with reference to the accompanying drawings in which.

DETAILED DESCRIPTION OF THE PREFERRED EMBODIMENTS

Figure 1:
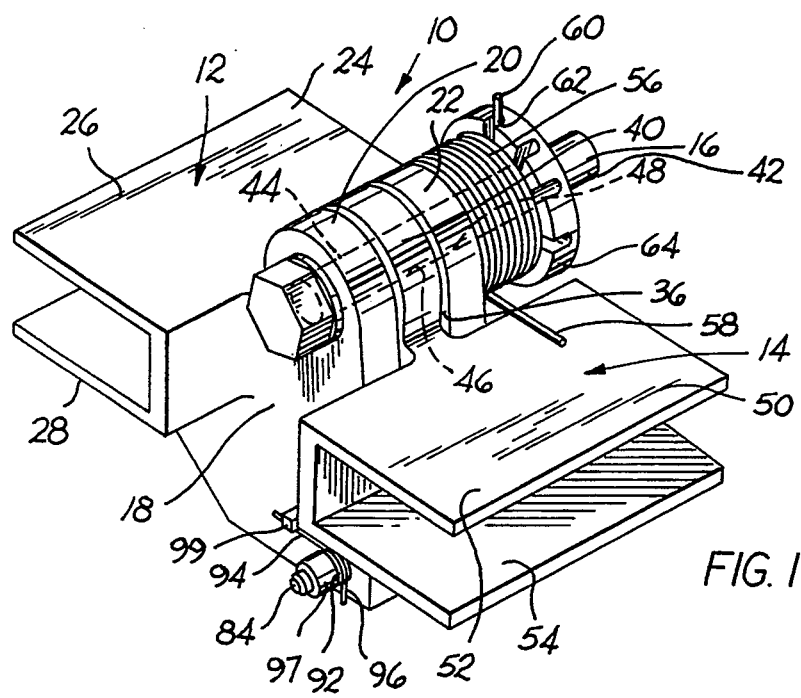
FIG. 1 is a perspective view of the deployment apparatus invention.
Figure 2:
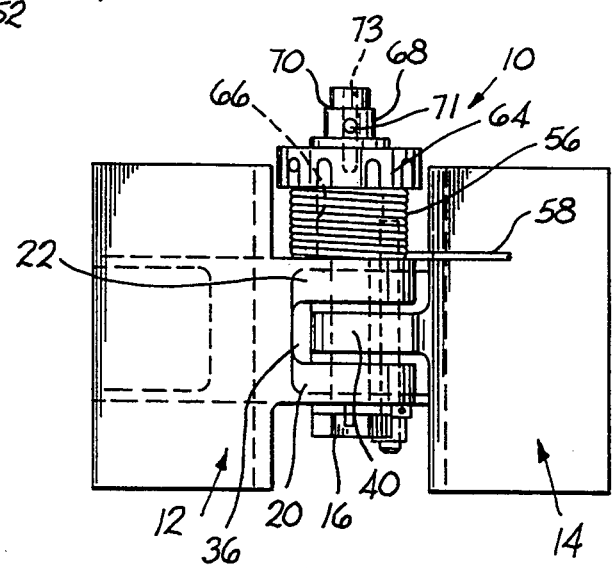
FIG. 2 is a top plan view of the deployment apparatus invention set forth in FIG. 1.
Figure 3:
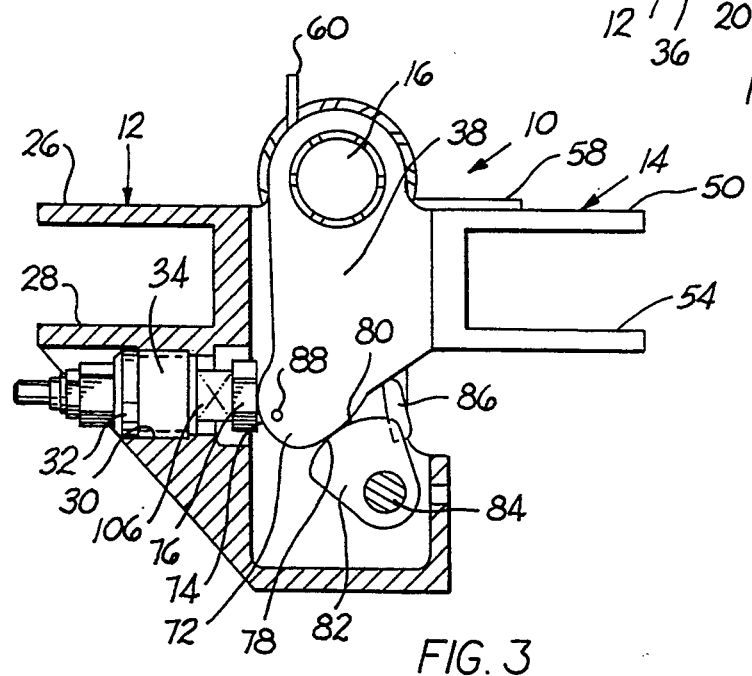
FIG. 3 is a side elevational view of the deployment apparatus invention illustrated in FIGS. 1 and 2 with a portion thereof broken away.

Referring first to FIGS. 1, 2, and 3 the deployment apparatus invention is illustrated and ]designated generally by the number 10. The deployment apparatus 10 comprises a first hinge member 12, a second hinge member 14, and means for pivotally connecting the hinge members 12 and 14 together comprising a pivot pin 16. The hinge member 12 has a hinge body portion 18 with two spaced apart hinge projections 20 and 22 and a fitting projecting portion 24 that has a generally U-shaped cross section and an upper substantially flat flange portion 26 and a lower substantially flat flange portion 28. As is illustrated in FIG. 3, the hinge body portion 18 has a threaded hole 30 that receives a generally cylindrical shaped attenuator capsule or module 32 with its threaded exterior surface 34 that will be hereinafter described in further detail. The attenuator capsule 32 has a portion thereof that projects into the gap 36 that exists between the hinge projections 20 and 22.

The second hinge member 14 has a hinge body portion 38 with a substantially flat projecting hinge portion 40 that is located between the hinge projections 20 and 22 and rotatably secured in place by the hinge pin 16 whose shank portion 42 slides into the holes 44, 46, and 48 of the respective hinge projections 20, 40, and 22. The body portion 38 has a fitting projecting portion 50 that has a generally U-shaped cross section and an upper substantially flat flange portion 52 and a lower substantially flat portion 54.

As best illustrated in FIGS. 1 and 2, the deployment apparatus 10 also includes means for biasing or powering the hinge members 12 and 14 into their open or deployed positions that comprises a suitable coil torsion spring 56 that is coiled around a portion of the shaft 42 of the hinge pin 16. The coil spring 56 has a projecting straight portion 58 on one end that contacts the upper surface of the flange portion 50 and a projecting straight portion 60 on the other end that fits within the slot 62 in a spring cap member 64 that has a hole 66 that receives a portion of the shank portion 42 of the hinge pin 16 and is secured in place by a locknut 68 that is threaded onto the outer end portion 70 of the shaft 42 of the hinge pin 16. Spring cap 64 is keyed to hinge pin 16 via pin 71 which rides in slot 73 of the shaft 42. As a consequence, the hinge members 12 and 14 are biased outward to their deployed positions by the spring 56.

As best illustrated in FIG. 3, the body portion 38 of the hinge member 14 has a projecting lobe portion 72 with a surface 74 that is adapted to contact a plunger head portion 76 of the attenuator capsule 32. The lobe portion 72 also has a surface 78 that is adapted to engage a complimentary cam surface 80 on a cam member 82 that is rotatably mounted and secured to a cam pin 84 that is secured by pin 85 to the body portion 18 of the hinge member 14.

The cam member 82 also has a projection 86 that extends outward from the side of the cam surface 80 that is sized, shaped, and located to be engaged by a projecting pin member 88 that extends outward from the side surface 90 of the lobe portion 72. The projection 86 is located so that as the lobe portion 72 rotates (as the hinge member 14 also rotates) to its extended or deployed position, the connected pin member 88 engages the projection 86 and causes the connected cam member 82 to rotate into position where its cam surface 80 can engage the adjacent surface 78 on the lobe portion 72. The cam member 82 is biased in a counter clockwise direction as viewed in FIG. 3 by a coiled torsion spring 92 that is also shown in FIG. 1 located around the shaft 84 that has end portions 94 and 96 that contact respectively the cam pin spring cap member 97 and a projection 99 of the hinge projection 20 of hinge member 12.

Figures 4, 5, 6A:
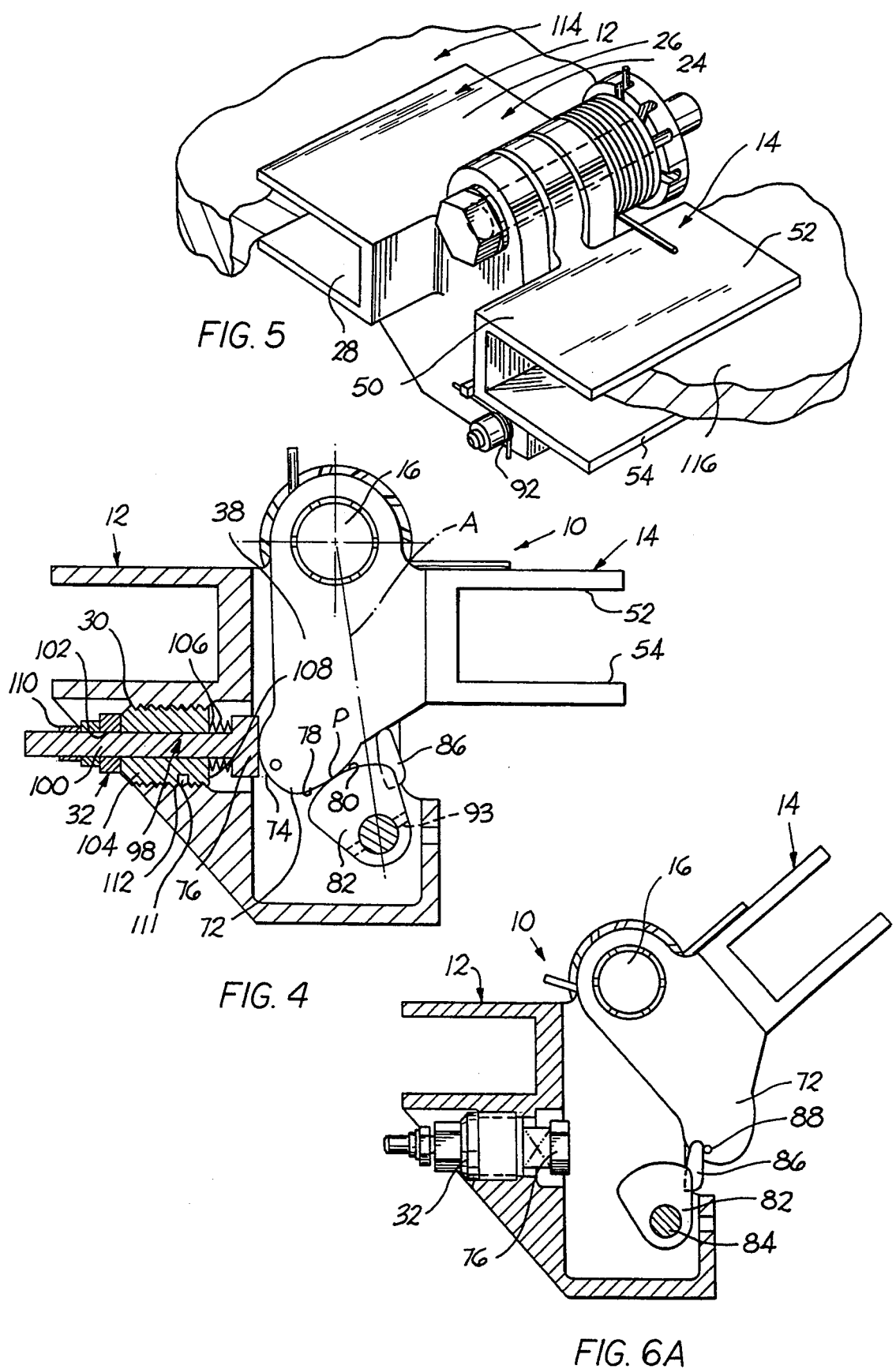
FIG. 4 is an enlarged view of a portion of the structure illustrated in FIG. 3.
FIG. 5 is a perspective view of the structure set forth in FIGS. 1 through 4 in use on a spacecraft deploying a spacecraft solar panel.
FIGS. 6A, 6B, 6C, and 6D are side elevational views with portions broken away of the deployment apparatus similar to the view in FIG. 3 illustrating the sequence of operation of the invention.

FIG. 4 illustrates in better detail the important features of the deployment apparatus 10 that was previously described with respect to the structure illustrated in FIGS. 1 through 3. FIG. 4 illustrates the deployment apparatus 10 with its hinge members 12 and 14 near their finally deployed positions. As illustrated, the lobe portion 72 that extends from the body portion 38 contacts the head portion 76 of the attenuator capsule 32. In addition, the cam surface 80 of the cam member 82 contacts the adjacent surface 78 on the lobe portion 72 at the point indicated by the letter P. This point of contact P is to the left of the line A that is a straight line through the points representing the central axes of the pivot pin 16 and the cam pin 84 that rotatably mount the respective hinge member 14 and the cam member 82. Because of this contact at the point P by the surface 80 of the cam member 82 with the surface 78 of the lobe portion 72, the hinge member 14 cannot backup or rotate backward in a counter clockwise direction. Also, the cam member 82 is biased into position with its surface 80 against the surface 78 of the lobe portion 72 by the coil spring 92 (see FIG. 1) since the cam member 82 is fixed to the cam pin by the pin 93.

Also, as illustrated in FIG. 4, the attenuator capsule 32 comprises a plunger 98 with its plunger shaft 100 that slides within a hole 102 in the generally cylindrical body member 104 and a head portion 76 that contacts the lobe portion 72. The attenuator capsule 32 also includes a series of spring washers 106 that fit around the shaft 100 and pushes against the end 108 of the body member 104. The amount of spring movement and attenuation is adjusted as a result of the threaded locknut 110 that is threaded to the outer portion of shaft 100.

As indicated, the body member 104 with its threads 112 of the attenuator capsule 32 is adjustable toward or away from the lobe portion 72 within the threaded hole 30 in the body portion 18 of the hinge member 12. Threaded hole 30 contains self-locking insert 111 which fixes body member 104 in place thereby also fixing head portion 76 to a precise predetermined position relative to lobe portion 72 of the hinge member 14.

FIG. 5 illustrates the deployment apparatus 10 in use on a spacecraft structure 114 with only a portion of the spacecraft structure being shown for clarity. As illustrated, the spacecraft structure 114 is substantially flat and is sized and shaped to fit within the upper and lower flange portions 26 and 28 of the fitting projecting portion 24 of the hinge member 12. In a similar manner, the fitting projecting portion 50 of the hinge member 14 has upper and lower flange portions 52 and 54 that attach to the structure to be deployed such as a flat panel member 116. The fitting projecting portions 24 and 50 of the respective hinge members 12 and 14 are secured to the respective structures 114 and 116 by means known in the art such as by bonding with a suitable high strength glue or the like or through suitable fasteners known in the art.

FIGS. 6A, 6B, 6C and 6D illustrate the deployment apparatus 10 in its various stages of deployment. FIG. 6A illustrates the deployment apparatus 10 is in its initial stages of operation. As the lobe portion 72 is rotating clockwise the projecting pin member 88 on the lobe portion 72 contacts the projection 86 on the cam member 82 and causes it to move to the left or counter clockwise about the cam pin 84 and this insures that the cam member 82 is in its proper position for preventing the backing up or reverse movement of the cam member 82.

Figure 6B:
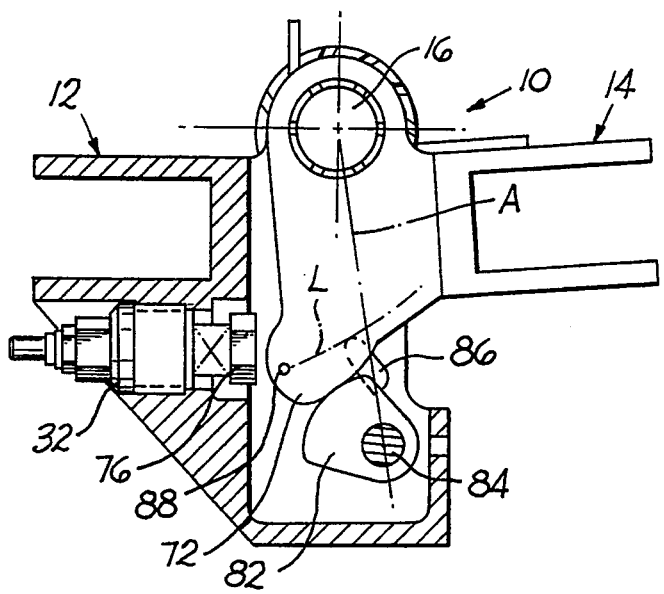

FIG. 6B illustrates the deployment apparatus 10 in its latter stages of deployment just as the important locking mechanism of the invention is being brought into operation. In this initial state or position of the deployment apparatus 10 the lobe portion 72 of the hinge member 14 has not contacted the plunger head portion 76 of the attenuator capsule 32 that is located on the hinge member 12. However, since the lobe portion 72 has rotated past the cam member 82 and the point of contact between the cam member 82 and the adjacent surface of the lobe portion is beyond or to the left of a straight line A drawn between the points representing the central axis of the pivot pin 16 and the cam pin 84, the lobe portion 72 cannot back out past the cam member 82. It should also be noted that the path for the pin illustrated by the line designated by the letter L is such that the pin member 88 on the lobe portion 72 has already driven the projection 86 on the cam member 82 and has rotated it counter clockwise against the bias provided by torsion spring 92 (FIG. 1) on the cam pin 84. This ensures that the cam member 82 is in its proper position for accepting the lobe portion 72. When pin 88 clears the projection 86 on cam member 82, the torsion spring 92 (FIG. 1) rotates the cam member 82 via the pin 84 clockwise and the cam member 82 engages the lobe portion 72 thereby preventing hinge member 14 from reversing direction.

Figure 6C:
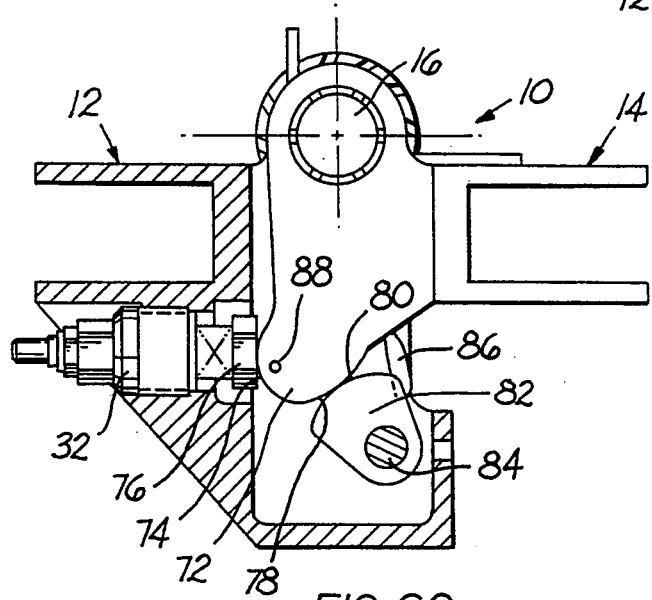

FIG. 6C illustrates the deployment apparatus 10 as the lobe portion 72 contacts the attenuator capsule 32. As illustrated, the hinge member 14 continues to rotate in a clockwise direction as viewed in FIG. 6C and the surface 74 of the lobe portion 72 contacts the plunger head portion 76 of the attenuator 32. In this position, the lobe portion 72 is trapped between the head portion 76 of the attenuator capsule 32 and the surface 80 on the cam member 82. In this position, the surface 80 of the cam member 82 continues to prevent reverse, backward or counterclockwise movement of the lobe portion 72. However, the lobe portion 72 can and does move clockwise against the head portion 76 as the hinge member 14 moves outward toward its deployed or extended position. As the lobe portion 72 continues to press against the head portion 76 as the hinge member 14 is being deployed it results in the head portion 76 compressing the spring washers 106 between it and the end or shoulder portion 108 of the body member 104. As a consequence, the spring washers 106 become increasingly more compressed and hence exert an increasingly stronger counter force against the adjacent surface 74 of the lobe portion 72.

Figure 6D:
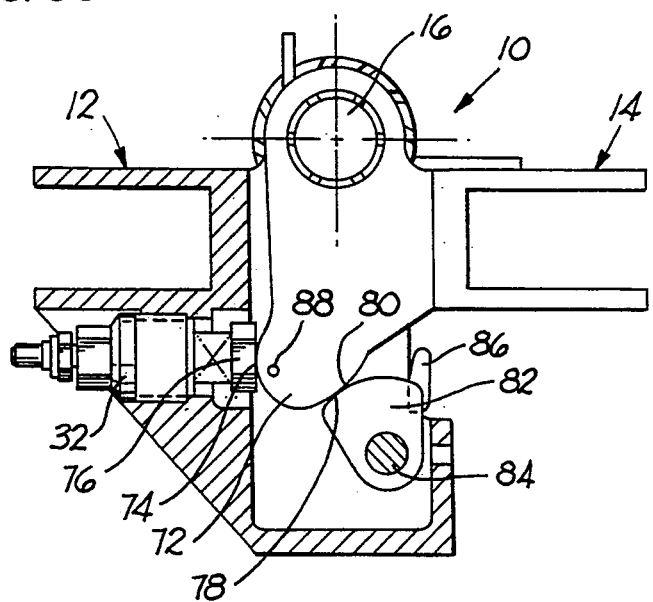

Finally, as the hinge member 14 continues its clockwise movement to its deployed or extended position, a point is reached where the spring washers 106 have reached a compressed position providing the necessary force to stop the hinge member 14. At this point, the hinge member 14 is in its fully extended or deployed position that is illustrated in FIG. 6D. As illustrated in FIG. 6D, the lobe portion 72 is still firmly locked into position between the head portion 76 that contacts the adjacent surface 74 of the lobe portion 72 and the cam member 82 with its surface 80 that contacts the surface 78 on the lobe portion 72. In this position, the lobe portion 72 is fixed in place and cannot move. Since the lobe portion 72 is an integral portion of the hinge member 14, the hinge member 14 is also rigidly secured in its fully deployed or extended position. As previously indicated, it is possible to adjust this fully deployed position through the use of the threaded portion 112 of the body member 104.

The deployment apparatus 10 is manufactured in the following manner. The hinge members 12 and 14 are manufactured from suitable aircraft grade aluminum stock or forgings by suitable machinery in a manner known to those skilled in the art. If the nature of the structure 116 demands, the hinge members 12 and 14 can be manufactured from titanium for added strength. The cam member 82 is also manufactured in a similar manner from high grade stainless steel or titanium as required. The pivot pin 16 and the cam pin 84 are manufactured in a manner known in the art from a suitable high grade stainless steel as are the body member 104, the plunger 98 and the lock nut 110 of the attenuator 32.

All of the springs forming part of the deployment apparatus 10 are made from suitable piano or spring wire and the spring washers 106 are also made from spring steel in a manner known to those skilled in the art. The assembly of the various parts is straight forward and will be obvious to anyone skilled in the art as will the manner of connecting the deployment apparatus 10 to the adjacent structure for its intended use. With respect to connecting the deployment apparatus 10 as indicated in FIG. 5 to the spacecraft structure 114, the fitting projecting portions 24 and 50 of the respective hinge members 12 and 14 can be connected to the respective spacecraft structure portion 114 and the spacecraft substantially flat panel member 116 by using a high grade epoxy glue or mechanical fasteners in a manner known to those skilled in the art.

In order to use the deployment apparatus 10 it is connected to the structure that is to be deployed in the previously indicated manner. Normally, the deployment apparatus 10 and the associated connected structure, such as the structure 114 and 116 illustrated in, FIG. 5, will be stored in its collapsed or undeployed configuration and secured in that stored configuration through means known in the art (not shown). Then, at the appropriate time this stored configuration securing means is released which releases the deployment apparatus 10 and associated structure. This results in the movement of the deployment apparatus 10 under the action of the coil spring 56 that in view of its leg portions 58 and 60 exerts a rotational deploying force on the flange portion 26 of the projecting portion 24 of the hinge member 12.

As a consequence, the hinge members 12 and 14 rotate outward with respect to each other until they reach the position indicated in FIG. 6A where the deployment apparatus 10 is in its initial stages of operation. As the lobe portion 72 is rotating the projecting pin member 88 on the lobe portion 72 contacts the projection 86 on the cam member 82 and causes it to move to the left or Counter clockwise about the cam pin 84 and this insures that the cam member 82 is in its proper position for preventing the backing up or reverse movement of the cam member 82 in FIG. 6B lobe 72 and pin 88 have traveled past cam projection 86. The lobe portion 72 of the hinge member 14 has not contacted the plunger head portion 76 of the attenuator 32 that is located on the hinge member 12, but the lobe portion 72 has rotated past the cam member 82 and the point of contact between the cam member 82 and the adjacent surface of the lob portion is beyond or to the left of a straight line A drawn between the points representing the central axis of the pivot pin 16 and the cam pin 84 and consequently, the lobe portion 72 cannot back out past the cam member 82.

The hinge member 14 continues to rotate in a clockwise direction as viewed in FIG. 6C and the surface 74 of the lobe portion 72 contacts the plunger head portion 76 of the attenuator 32. In this position, the lobe portion 72 is trapped between the head portion 76 of the attenuator 32 and the surface 80 on the cam member 82 and the surface of the cam member 82 prevents reverse or counterclockwise movement of the lobe portion 72. The lobe portion 72 moves clockwise against the head portion 76 as the hinge member 14 moves outward toward its deployed or extended position and the lobe portion 72 continues to press against the head portion 76 as the hinge member 14 is being deployed. This results in the head portion 76 compressing the spring washers 106 between it and the end or shoulder portion 108 of the body member 104 and the spring washers 106 become increasingly more compressed and hence act to attenuate both the movement and shock force applied to hinge member 14.

As the hinge member 14 continues its outward movement to its deployed or extended position, a point is reached where the spring washers 106 have reached, as illustrated in FIG. 6D, a point where the spring washers 106 are in their fully compressed positions and cannot be compressed any further. At this point, the hinge member 14 is in its fully extended or deployed position and the lobe portion 72 is locked into position between the head portion 76 that contacts the adjacent surface 74 of the lobe portion 72 and the cam member 82 with its surface 80 that contacts the surface 78 on the lobe portion 72. In this position, the lobe portion 72 is fixed in place and cannot move and since the lobe portion 72 is an integral portion of the hinge member 14, the hinge member 14 is also rigidly secured in its fully deployed or extended position.

As previously indicated, it is possible to vary the fully deployed position of the hinge member 14 via movement of attenuator capsule 32 with its threads 112 within threaded hole 30.

Although the invention has been described in considerable detail with reference to certain preferred embodiments, it will be understood that variations and modifications may be made within the spirit and scope of the invention as defined in the appended claims.

What is claimed is:

1. Deployment apparatus comprising a first hinge member, a second hinge member, means for pivotally connecting said first hinge member to said second hinge member, said first and said second hinge members having a deployed position with respect to each other, means for biasing said first hinge member and said second hinge member into the deployed position with respect to each other and a mechanical attenuator associated with one of said hinge members for dampening oscillatory movement of one of said hinge members with respect to the other of said hinge members, said mechanical attenuator comprising a plunger member and a spring member that biases said plunger member into contact with a portion of one of said hinge members.

2. The deployment apparatus of claim 1 wherein said mechanical attenuator is adjustable.

3. The deployment apparatus of claim 1 further comprising means for locking one of said hinge members with respect to the other hinge member.

4. The deployment apparatus of claim 3 wherein said locking means comprises a cam member.

5. The deployment apparatus of claim 4 wherein said locking means further comprises a projecting lobe located on one of said hinge members and said cam member is located on the other hinge member in position to engage the projecting lobe located on the other hinge member.

6. The deployment apparatus of claim 5 wherein said locking means further comprises a positioning member located on said cam member for moving said cam member into a camming position when said hinge member with the projecting lobe moves into the deployed position.

7. The deployment apparatus of claim 6 wherein said locking means further comprises a projecting member located on said projecting lobe for contacting the positioning member located on said cam member to move the cam member into a camming position.

8. Spacecraft structure deployment apparatus for deploying a spacecraft articulating structure comprising a first hinge member connected to a portion of said spacecraft, a second hinge member connected to said spacecraft articulating structure, said first and said second hinge members having a deployed position with respect to each other and further comprising means for biasing said first hinge member and said second hinge member into the deployed position with respect to each other, and a mechanical attenuator associated with at least one of said hinge members for dampening oscillatory movement of one of said hinge members with respect to the other of said hinge members, said mechanical attenuator comprising a plunger member and a spring member that biases said plunger member into contact with a portion of one of said hinge members.

9. The spacecraft structure deployment apparatus of claim 9 wherein said mechanical attenuator is adjustable.

10. The spacecraft structure deployment apparatus of claim 9 further comprising means for locking one of said hinge members with respect to the other hinge member.

11. The spacecraft structure deployment apparatus of claim 10 wherein said locking means comprises a cam member.

12. The spacecraft structure deployment apparatus of claim 11 wherein said locking means further comprises a projecting lobe located on one of said hinge members and said cam member is located on the other hinge member in position to engage the projecting lobe located on the other hinge member.

13. The spacecraft structure deployment apparatus of claim 12 wherein said locking means further comprises a positioning member located on said cam member for moving said cam member into a camming position when said hinge member with projecting lobe moves into the deployed position.

14. The spacecraft structure deployment apparatus of claim 13 wherein said locking means further comprises a projecting member located on said projecting lobe for contacting the positioning member located on said cam member to move the cam member into a camming position.

* * * * *